No. 660,188. Patented Oct. 23, 1900.
W. P. GRATH.
BRICK MACHINE.
(Application filed Dec. 20, 1899.)

(No Model.) 3 Sheets—Sheet 1.

Fig. I.

Attest:
Jno. B. Reno.
Jno. G. Thomson

Inventor:
Walter P. Grath,
by Court Carr,
Attys.

THE NORRIS PETERS CO., PHOTO-LITHO., WASHINGTON, D. C.

No. 660,188. Patented Oct. 23, 1900.
W. P. GRATH.
BRICK MACHINE.
(Application filed Dec. 20, 1899.)

(No Model.) 3 Sheets—Sheet 2.

Attest:
John B. Reno.
Geo. G. Thomson

Inventor:
Walter P. Grath,
by Carr & Carr,
Attys.

No. 660,188. Patented Oct. 23, 1900.
W. P. GRATH.
BRICK MACHINE.
(Application filed Dec. 20, 1899.)
(No Model.) 3 Sheets—Sheet 3.
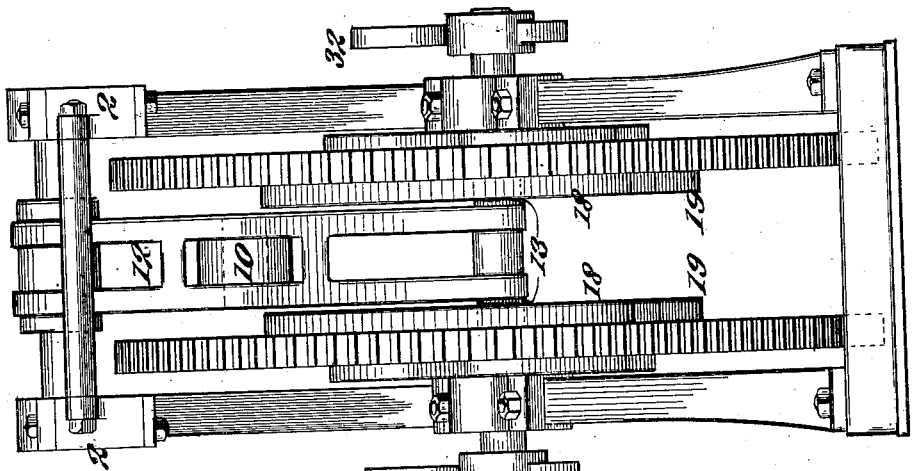
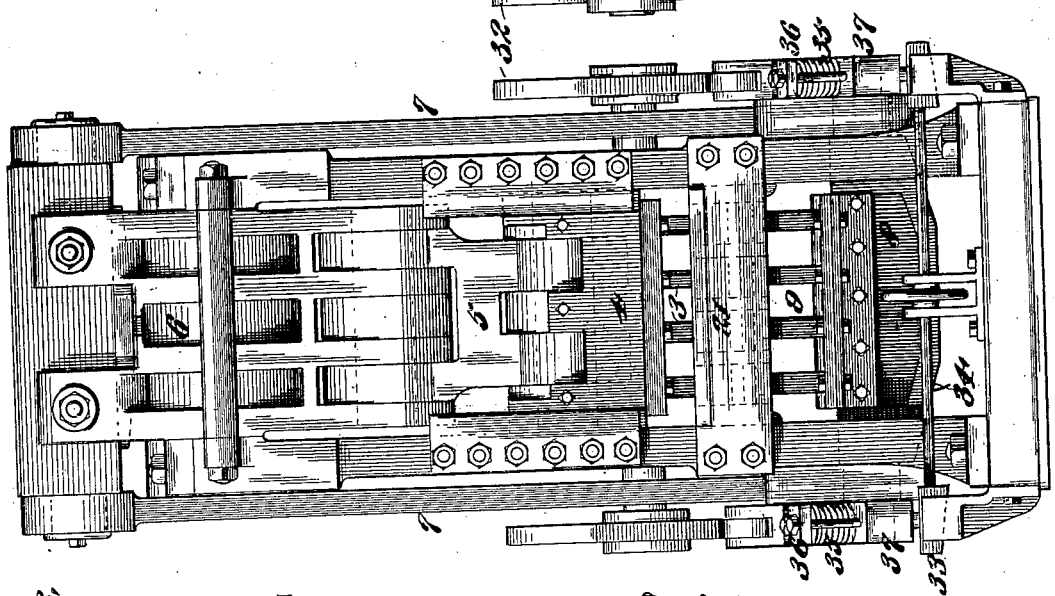
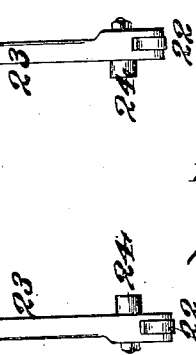
Attest:
John B. Reno
Jno. G. Hamson
Inventor,
Walter P. Grath,
by Court Carr,
Attys.

UNITED STATES PATENT OFFICE.

WALTER P. GRATH, OF ST. LOUIS, MISSOURI.

BRICK-MACHINE.

SPECIFICATION forming part of Letters Patent No. 660,188, dated October 23, 1900.

Application filed December 20, 1899. Serial No. 740,967. (No model.)

*To all whom it may concern:*

Be it known that I, WALTER P. GRATH, a citizen of the United States, and a resident of the city of St. Louis, in the State of Missouri, have invented a new and useful Brick-Machine, of which the following is a specification.

My invention relates to brick-machines, and has for its objects to simplify the construction, cheapen the cost, and increase the efficiency of the machine.

To these ends my invention consists in the arrangements and combinations of parts hereinafter described and claimed.

Figure 1:
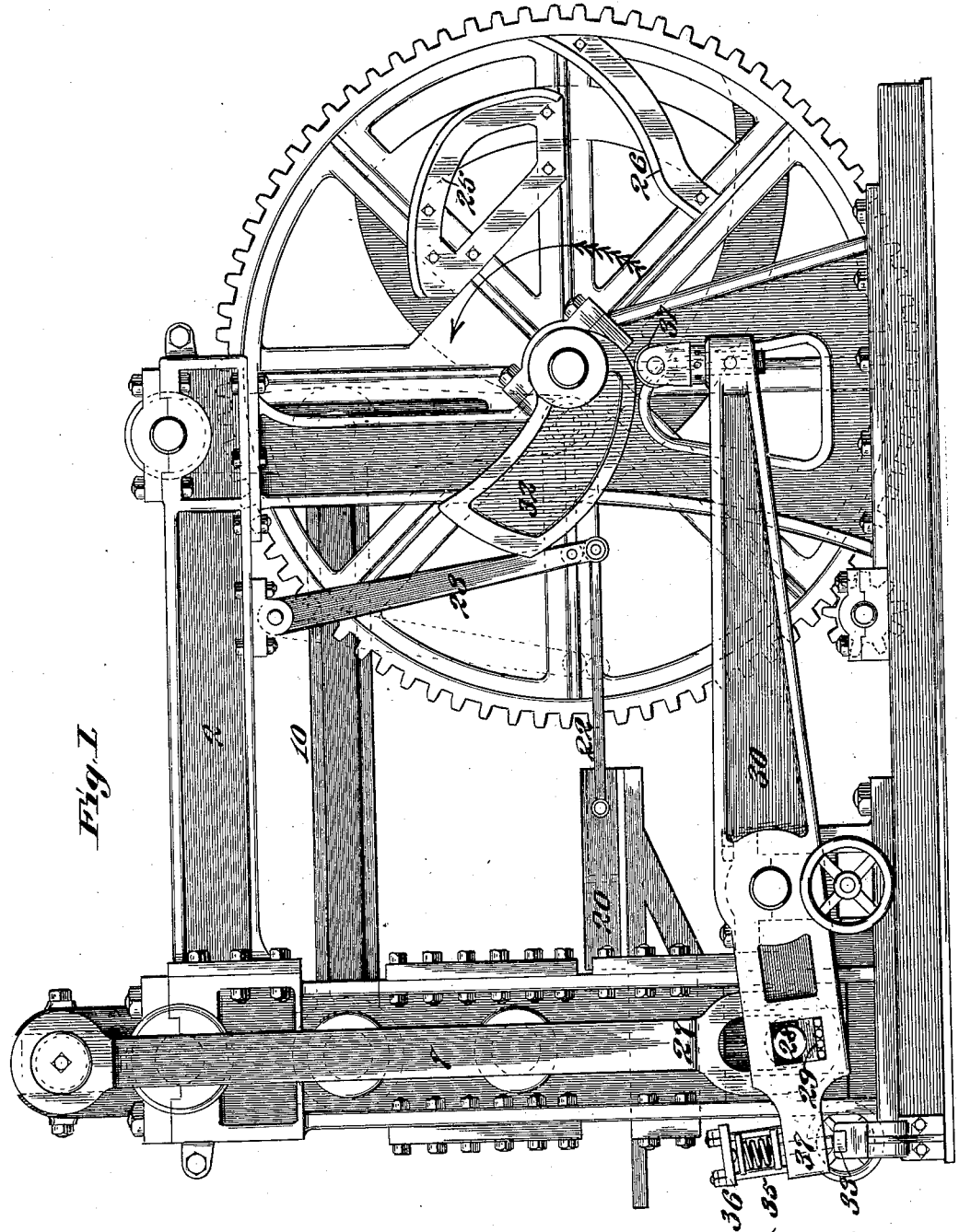
Figure 2:
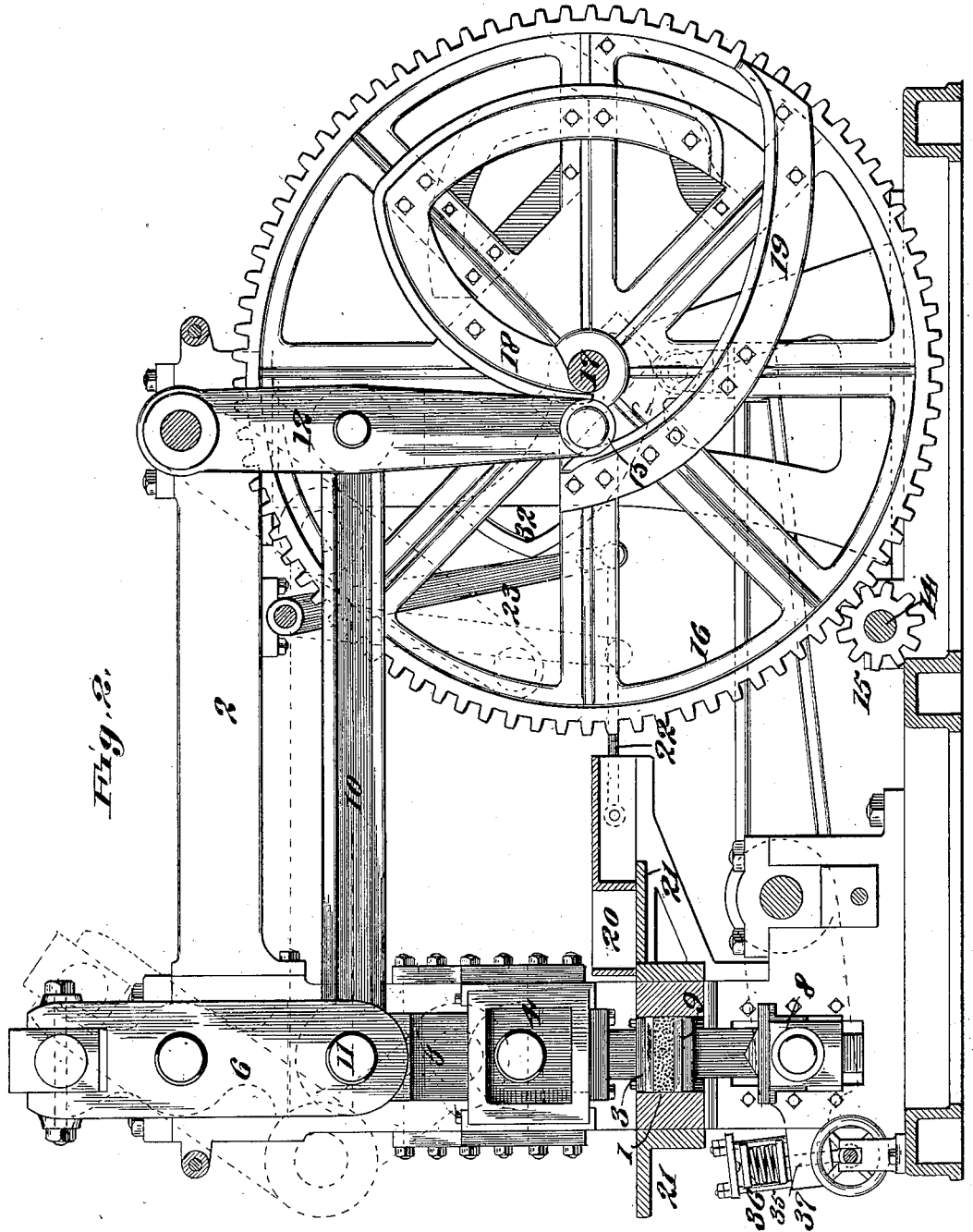

In the accompanying drawings, which form part of this specification and wherein like symbols refer to like parts wherever they occur, Figure 1 is a side elevation of my machine. Fig. 2 is a central longitudinal vertical section. Fig. 3 is an end elevation looking to the right in Fig. 1. Fig. 4 is an end elevation looking to the left in Fig. 1 and showing only the end portions of the machine, and Fig. 5 is a detail of the charger-actuating mechanism.

My invention comprises a series of molds 1, mounted in the framework 2 and having vertically-movable plungers working through the tops and bottoms of said molds. The upper plungers 3 are preferably mounted on the same shank or ram-head 4, which is guided to move vertically. At the upper end of the shank or ram-head a link or links 5 are pivotally fastened thereto, and the link or links 5 are likewise pivotally fastened to the end of a lever 6, journaled horizontally in the framework, whereby said link and lever constitute a toggle. Long side rods or bars 7 connect the opposite end of this lever to the shank 8 of the lower plungers 9, the connections of said rods being pivotal at each end. A horizontal draw-bar 10 is pivotally secured to the toggle-pin 11 or pin which fastens the toggle-lever to the links, and the other end of this draw-bar fits between and is pivotally fastened to the forks of a lever 12 or two parallel levers journaled vertically at one end in the framework. The other end of each fork or lever 12 has a laterally-projecting roller 13 mounted thereon in position to be operated by the cams hereinafter described.

The motive power for operating the machine is applied by any suitable mechanism to a driving-shaft 14, which carries small gear-wheels 15, which gear-wheels mesh with large gear-wheels 16, fixed on a shaft 17, journaled in the frame. On the adjacent faces of these large gear-wheels are mounted cams arranged to bear against the respective rollers on the forks of the pulling-lever 12. Each cam consists of two members, the first member 18 extending in a convex curve from near the shaft of the wheels to near the periphery of the gear-wheel and thence curved concentrically with the periphery through an arc of about eighty degrees. The second member 19 is mounted on the gear-wheel and extends about one hundred and fifty degrees in a concave curve from the periphery opposite the end of the first member to a point near the center of the wheel opposite the inner end of the first member. The space between the two members is sufficient to allow free passage of the roller on the end of the pulling-lever 12, and the parts are so proportioned and arranged that the pulling-lever and the toggles are all in vertical position when the roller on the pulling-lever is opposite the inner end of the second member of the cam. For the purpose of making the mechanism reversible it is desirable to continue each member of the cam parallel with the operative surface of the other member, so that there is a continuous channel for the roller.

The operation of the device thus described is as follows: When power is applied to the driving-shaft, its small gear-wheels drive the cam-gears with multiplied power and in the direction indicated by the arrow in Fig. 1. When the convex curve of the first member of a cam bears against its corresponding roller on the pulling-lever, it swings the lever backward with a quick movement to bend the toggle and raise the upper plunger. The pulling-lever and the parts connected thereto remain in this position while the roller is passing over the concentric portion of the first member; but said lever is driven forward by the second member of the cam with a gradually-decreasing speed and a correspondingly-increasing power. The forward movement of the pulling-lever straightens the toggle, so as to force the upper plungers downwardly and the lower plungers upwardly, and thereby compress the clay in the mold.

As the cams on the two gear-wheels are of the same form and size and mounted in the same position, they coöperate in actuating the pulling-lever and have the most important advantage of balancing stresses that would be dangerous to a single cam.

In order to charge the molds automatically, a charging-box 20 is arranged to reciprocate on a horizontal table 21 and below a feed-chute. (Not shown.) Links or rods 22, pivotally fastened at one end to the charging-box, are pivotally fastened at their other ends to a swinging arm or arms 23, journaled in the framework to swing in vertical planes and carrying laterally-projecting shoulders or rollers 24. Mounted on each of the large gear-wheels, so as to move with said wheels, is a cam or cams arranged to bear against the rollers 24 on said swinging arms. This cam consists of two members located with reference to the plunger-driving cam and on the opposite side of the large gear thereto. The first member 25 consists of a large flanged piece extending outwardly in a convex curve beginning near the same angular position at which the first member of the first cam reaches its outermost position. Thence said curve extends outwardly and backwardly over an angular arc of about twenty-five degrees and thence is continued concentrically with the wheel for a small angle to the radial line at which the second member of the cam begins. This second member 26 starts at a point far enough beyond the first member radially to permit the passage of the roller on the swinging arm. Then it continues inwardly in a concave curve extending over an angle of about thirty degrees and terminates nearly in the same radial line with the end of the concentric portion of the first member of the plunger-driving cam. Each of the two members may be continued parallel with the operative edge of the other, so as to form a continuous channel or path.

The operation of the charging mechanism is as follows: When the large gear or gears have turned to the point at which the first member of the plunger-driving cam has raised the upper plunger nearly or quite enough to admit the charger below it, the first member of the charger-actuating cam pushes the charger quickly forward over the mold, and then the second member quickly withdraws it just as the second member of the plunger-driving cam begins to lower the upper plunger.

In order to eject the molded bricks from the molds, the side bars or rods 7, which pull the lower plungers, have vertically-elongated slots 27 formed therein, in which the pins or projections 28 of the lower plungers rest. These pins or projections extend through the slots in the side bars into bearings 29, arranged in slots provided therefor near the ends of two levers 30, journaled horizontally in the framework. The other end of each lever carries a roller 31, adjustably mounted thereon in the path of a cam 32, corresponding thereto and mounted on the shaft of the large gear-wheels outside of the frame. This cam 32 has a convex-curved edge extending outwardly a sufficient radial distance to produce such a throw of the lever as will raise the upper surface of the lower plunger flush with the top of the mold. This cam is so located that its inner end is at a point opposite the contact edge of the roller just after the toggle becomes vertical and begins to bend. Thence said cam extends outwardly in a convex curve, covering such an angular distance that the outer end of the curve bears against the roller just after the charger-actuating cam has begun the forward movement of the charger. From the outer end of the curve thus located the cam edge extends concentrically through a small angle, whereby the lower plunger is held in its elevated position for all or the greater portion of the time during which the charger pushes the molded brick therefrom. The two cams thus operate in unison. When the concentric portion of each cam passes its roller, the weight of the lower plunger depresses the lever and restores the lower plungers to their initial positions.

In order to regulate the amount of clay in the molds, the position of the lower plungers is varied by means of any adjustable backstop or support for the ejecting-lever. A convenient device for this purpose consists in beveled blocks 33, arranged to slide on correspondingly-beveled surfaces of the framework. As shown the drawings, the beveled blocks are arranged opposite each other and are threaded in opposite directions, and said blocks are worked simultaneously by means of a rod 34, threaded to work in said blocks, but fixed longitudinally.

Instead of the ejecting-levers 30 resting directly upon their adjustable supports an automatically-yielding spring or cushion is arranged between each lever and said support in order to permit an initial downward movement of the clay in the mold. The cushion shown in the drawings consists of a spring 35, bearing upwardly against a plate 36, bolted to the lever, and having its other end bearing against the head of a bolt 37, which rests on the adjustable block. The spring resists the weight of the plungers, and the position at which the plungers come to rest is thus determined by the adjustment of the support for the spring. The bearing provided for the plunger-pins in the ejecting-lever is preferably mounted on antifriction-rollers, so as to have a slight play or endwise movement endwise of the lever.

Obviously my device admits of considerable modification, and I do not wish to restrict myself to the details of construction hereinbefore set forth.

What I claim is—

1. A brick-machine comprising a framework, a mold having movable plungers constituting the top and the bottom thereof, a lever pivoted in the framework, links connecting the respective ends of said lever to said plungers, a draw-bar coöperating with said lever and links to constitute a toggle for operating said plungers, a lever or levers fulcrumed in said framework and pivotally connected to said draw-bar, a cam or cams of increasing power for operating said lever and means for actuating said cam or cams, substantially as described.

2. A brick-machine comprising a framework, a mold having movable plungers constituting the top and the bottom thereof, a lever pivoted in the framework, links connecting the respective ends of said lever to said plungers, a draw-bar coöperating with said lever and links to constitute a toggle for operating said plungers, a lever or levers fulcrumed in said framework and pivotally connected to said draw-bar, and cam-gears of increasing power journaled in said framework, said draw-bar being between and actuated by said cam-gears, substantially as described.

3. A brick-machine comprising a framework, a mold having movable plungers constituting the top and the bottom thereof, a lever pivoted in the framework, links connecting the respective ends of said lever to said plungers, a draw-bar coöperating with said lever and links to constitute a toggle for operating said plungers, a lever or levers fulcrumed in said framework and pivotally connected to said draw-bar, and gears journaled in said framework and carrying cams for actuating the draw-bar lever, said cams being on opposite sides of said draw-bar lever and extending inwardly to bear against said lever simultaneously with increasing power, substantially as described.

4. A press comprising a mold having movable plungers constituting the top and the bottom thereof, means for exerting pressure on said plungers, said means being normally out of operative relation to the lower plunger, a lever for supporting said lower plunger; means operated by the driving-gearing to actuate said lever periodically and a yielding back-stop for limiting the position of said lever, substantially as described.

5. A press comprising a mold having movable plungers constituting the top and the bottom thereof, means for exerting pressure on said plungers, a spring-pressed lever or levers for yieldingly supporting the lower plunger, a shaft and a cam carried thereby for actuating said lever periodically independently of the pressure-exerting means, substantially as described.

6. A press comprising a mold having movable plungers constituting the top and the bottom thereof, means for exerting pressure on said plungers, a spring-pressed lever or levers for yieldingly supporting the lower plunger, a shaft, a cam thereon for actuating said lever periodically independently of the pressure-exerting means, said lever having a roller or bearing-piece adjustable with reference to said cam, substantially as described.

7. A press comprising a framework, a mold having movable plungers constituting the top and the bottom thereof, a lever connected by links to said plungers, a draw-bar connected to the lever and shorter link for operating said plungers, a second lever fulcrumed in the framework and having the draw-bar connected thereto, a cam of gradually-increasing power operating on said lever, a third lever for supporting the lower plunger, a cam for actuating said lever and an adjustable spring for supporting said lever, substantially as described.

WALTER P. GRATH.

In presence of—
   JOHN B. RENO,
   JAMES A. CARR.